United States Patent [19]
Anderson et al.

[11] Patent Number: 5,230,280
[45] Date of Patent: Jul. 27, 1993

[54] GAS FIRED DONUT SYSTEM

[75] Inventors: Edward M. Anderson, Plymouth; Merritt K. Anderson, Minneapolis; Andrew Kuehn, III, St. Paul, all of Minn.

[73] Assignee: Lil' Orbits, Inc., Minneapolis, Minn.

[21] Appl. No.: 740,926

[22] Filed: Aug. 6, 1991

[51] Int. Cl.⁵ .......................... A47J 37/12; F23N 5/26
[52] U.S. Cl. .......................... 99/404; 99/403; 126/391; 126/374; 431/18
[58] Field of Search ............... 126/391, 374, 351, 268, 126/265; 431/18, 24, 26, 77, 78; 99/403, 406, 404, 405; 363/55, 56

[56] References Cited

U.S. PATENT DOCUMENTS

| | | | |
|---|---|---|---|
| 3,283,695 | 11/1966 | Belshaw et al. | 99/405 |
| 3,902,839 | 9/1975 | Matthews | 431/25 X |
| 3,914,092 | 10/1975 | Matthews | 431/66 |
| 3,947,220 | 3/1976 | Dietz | 431/27 X |
| 4,082,033 | 4/1978 | Fester | 99/406 |
| 4,176,590 | 12/1979 | Kochan | 99/405 |
| 4,303,385 | 12/1981 | Rudich, Jr. et al. | 431/70 |
| 4,350,891 | 9/1982 | Wuerflein | 363/95 |
| 4,680,664 | 7/1987 | Lewthin | 363/56 |
| 4,690,127 | 9/1987 | Sank | 126/391 |
| 4,823,247 | 4/1989 | Tamoto | 363/16 |
| 4,996,637 | 2/1991 | Piechnick | 363/16 |
| 5,059,117 | 10/1991 | Wills | 432/176 |

OTHER PUBLICATIONS

Honeywell "Direct Spark Ignition Control Module" S87A, B, C, D, J, K (no date).
Operating Instructions Model SS1200 Lil' Orbits (no date).

Primary Examiner—Carl D. Price
Attorney, Agent, or Firm—Haugen and Nikolai, P.A.

[57] ABSTRACT

Gas fired donut cooking system for automatic cooking of donuts featuring a low voltage controlled gas fired tube for heating of the cooking oil. Operation is powered from ordinary household current or can be powered by a storage battery and a power inverter at a remote site where household current is unobtainable. Propane or butane gas is supplied from a bottle.

4 Claims, 6 Drawing Sheets

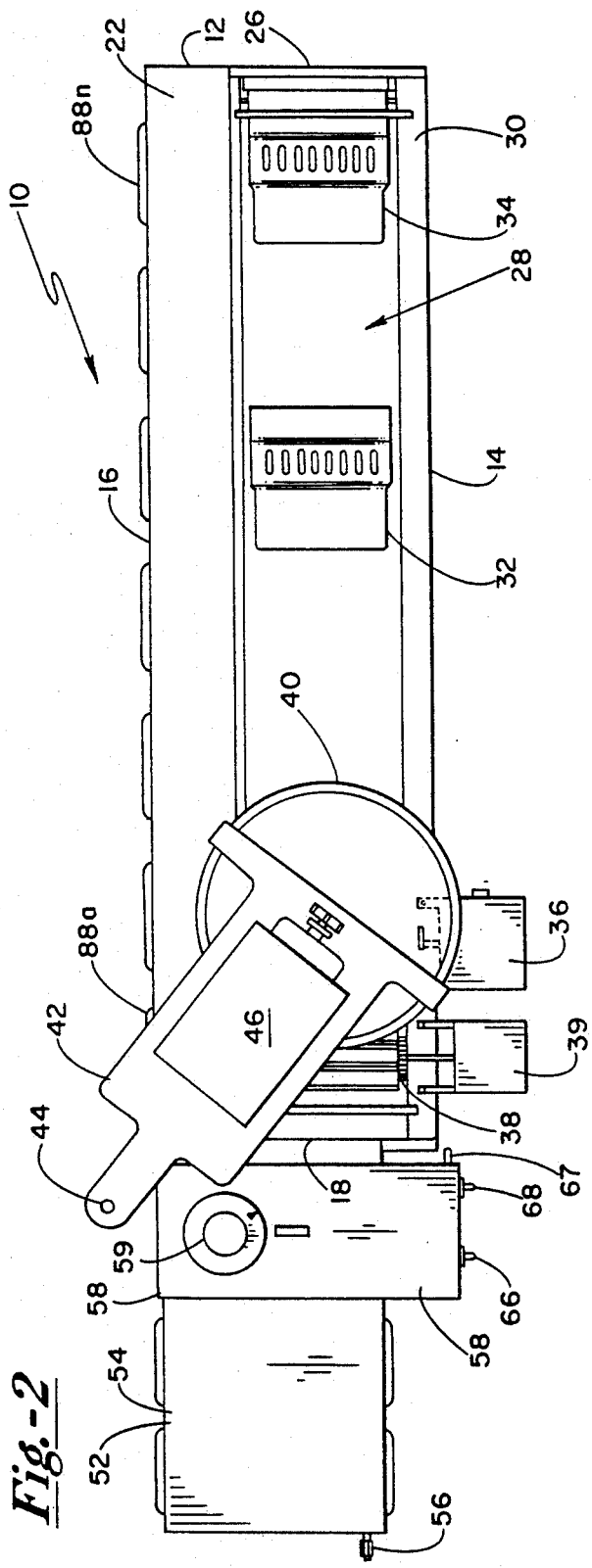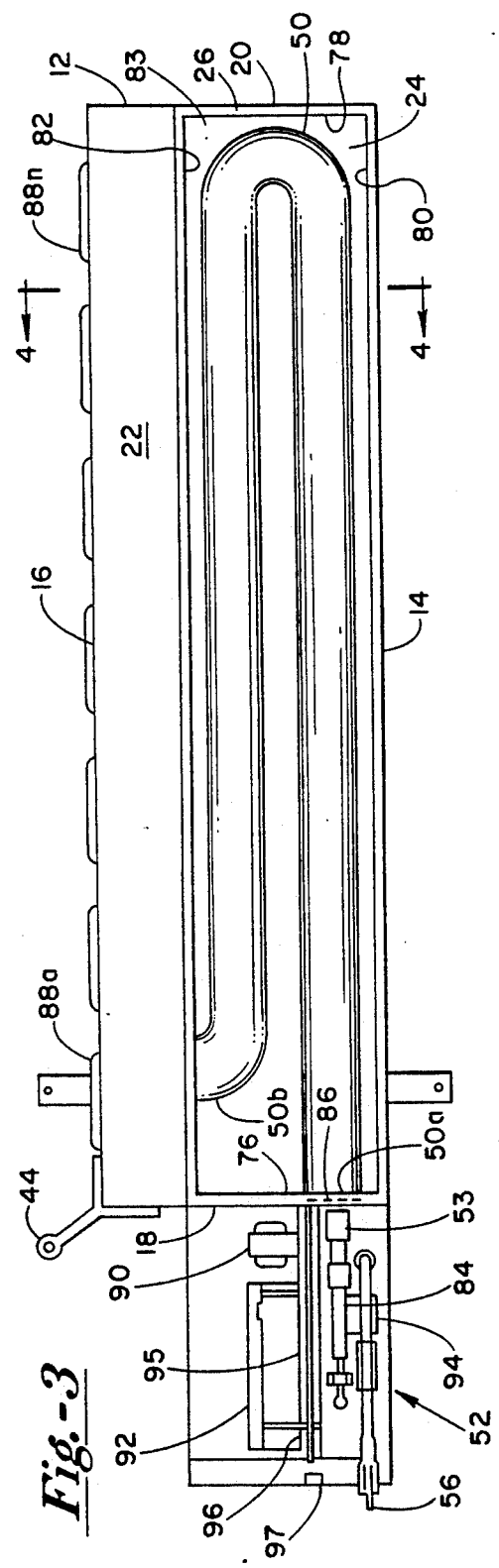

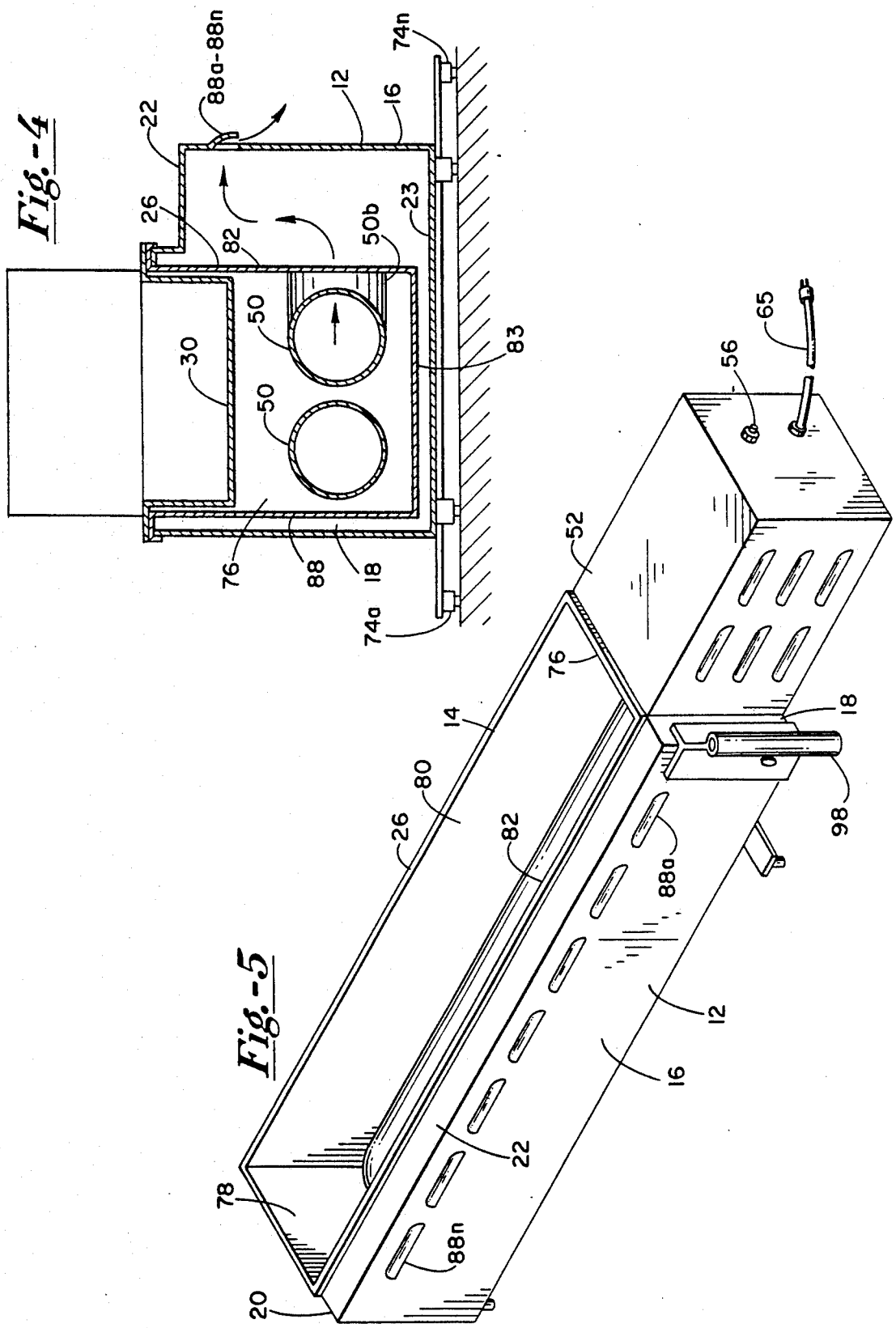

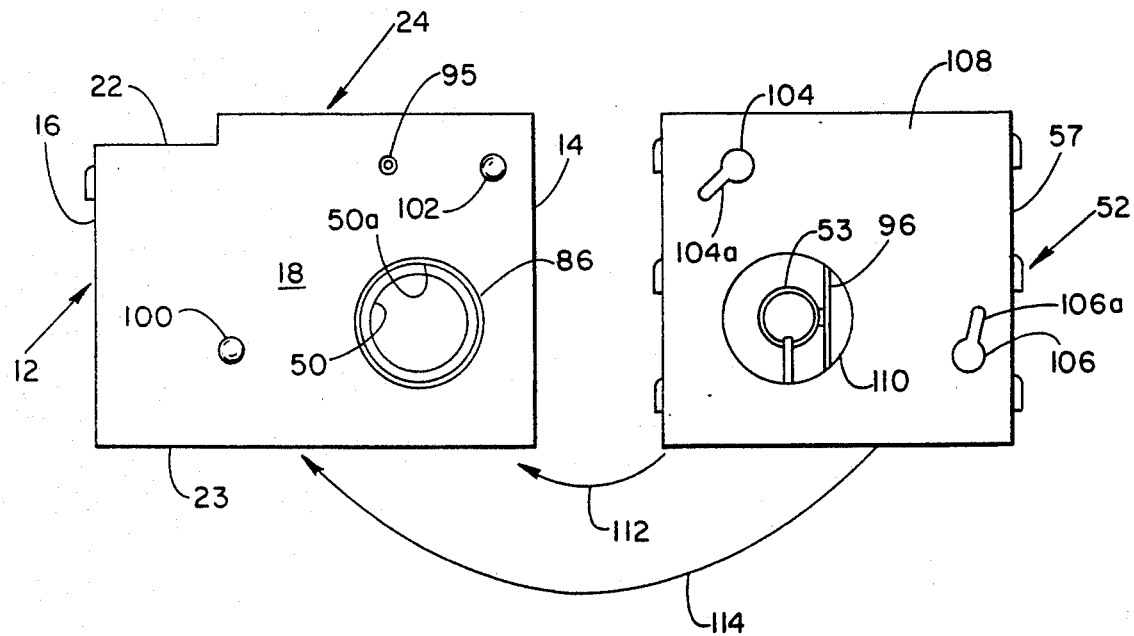
Fig.-6 BATTERY INVERTER

GAS FIRED DONUT SYSTEM

BACKGROUND OF THE INVENTION

1. Field of the Invention

The present invention pertains to a gas fired donut system, and more particularly, pertains to a gas fired donut system having a gas fired liquid heating tube and a processing of powering the donut system cooker by a storage battery and inverter.

2. Description of the Prior Art

Prior art cooking devices, such as donut machines, have been location limited in that often there were no convenient source of alternating current. Sources of power available at sites frequented by vendors were limited if even existent. Usually a vendor either had to "string" long extension cords if power was available. In the alternative, the vendor had to use an AC generator to power the equipment.

The present invention overcomes the inadequacies of the prior art by providing a gas fired donut system which operates from battery power at remote sites. Safety interlocks prevent inadvertent flame propagation and other unsuitable situations due to operator carelessness or inattention. The donut system can also be converted over to electrical operation.

SUMMARY OF THE INVENTION

The general purpose of the present invention is a gas fired donut system which is automatic in operation, and which contains an enclosed gas fired heater tube and a power inverter for supply operating power from a simple storage battery.

According to one embodiment of the present invention, there is provided an enclosure with a gas fired tube enclosed for the heating of cooking oil contained in a fry tank and handled cooking tray. A detachable low voltage gas firing module aligns with the enclosure and the enclosed gas fired tube to provide flame heat for the gas fired tube. A temperature controller unit also houses and provides control of a paddle wheel assembly, a servo motor assembly, and a hopper drive motor. An external battery and power inverter powers the temperature controller for remote site generation where AC power is not suitable. Donut dough is dispensed by a variable output hopper onto flowing hot cooking oil. Donut flippers turn the donuts over and also eject donuts from the handled cooking tray. Appropriate interlocks prevent inadvertent gas firing when major components are disconnected from each other.

One significant aspect and feature of the present invention is a gas fired cooking tube.

Another significant aspect and feature of the present invention is a detachable firing module.

A further significant aspect and feature of the present invention is a power inverter for operation at a remote site where AC power is not available.

Yet another significant aspect and feature of the present invention is a power inverter which has 120 volt AC output.

Still another significant aspect and feature of the present invention is a battery powered gas fired donut system through the use of a power inverter.

An additional significant aspect and feature of the present invention is the use of interlocks to prevent inadvertent flame propagation.

Having thus described one embodiment of the present invention, it is the principal object hereof to provide a gas fired donut cooking system.

Another object of the present invention is a gas fired donut cooking system which can be operated by a battery and a power inverter.

Another object of the present invention is a safe donut cooking system including interlocks for appropriate gas ignition.

Other objects of the present invention include a safety proven design that operates with standard propane or butane tanks. The donut system includes many fail-safe devices to prevent misuse. All gas components are A.G.A. listed. All electrical enclosures are UL approved. The donut system operates with quick hookup. Simply fill the machine with oil, attach quick-disconnect gas line to heating module, plug in the power cord for motors into a specially-designed inverter, which is powered by a 12 volt battery and one is in business. The donut system is variable speed. Solid state speed control varies output from a tantalizing 1 donut per minute up to full speed. One can pace output to sales demand, and always get action attraction. The donut system is easy to clean with only eight basic components. Chains, sprockets, and conveyor flights have been eliminated. It is a breeze to clean.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 illustrates a top view of the gas fired donut cooking system;

FIG. 3 illustrates a top view of the gas fired donut cooking system with various members removed;

FIG. 4 illustrates a cross-sectional view along line 4—4 of FIG. 3;

FIG. 5 illustrates a perspective view of the rear side of the enclosure, fry tank and firing module;

FIG. 6 illustrates the mating surfaces of the firing module and the enclosure;

DESCRIPTION OF THE PREFERRED EMBODIMENTS

Figure 1:
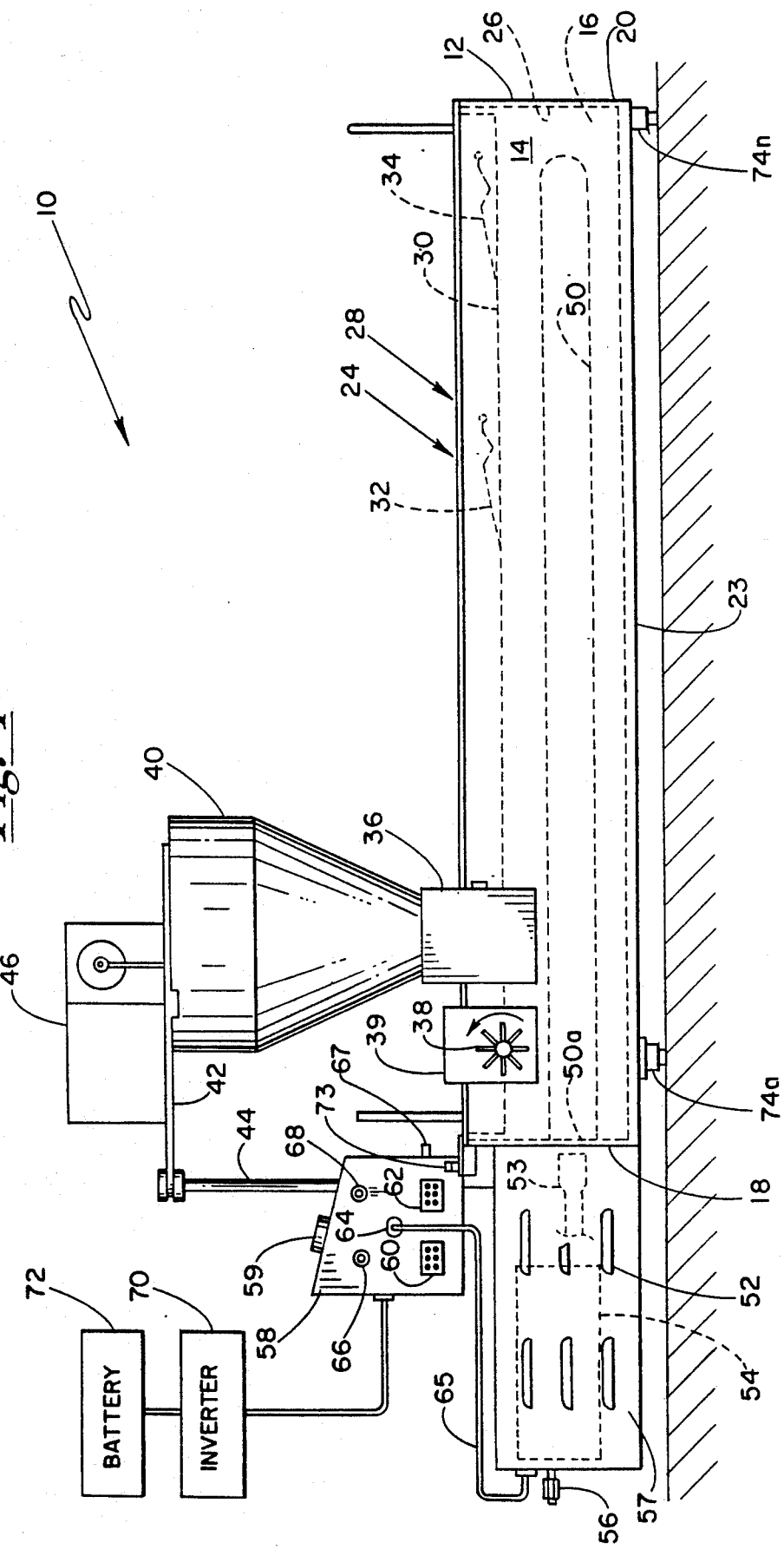
FIG. 1 illustrates a side view of a gas fired donut cooking system.

FIG. 1 illustrates a side view of a gas fired donut cooking system 10 including an essentially rectangular shaped enclosure 12 having a front side 14, a back side 16, a left end 18, a right end 20, a top side 22, as illustrated in FIG. 2, a bottom 23, and a rectangular top lipped opening 24. A rectangular fry tank 26 with an open top opening 28 aligns in and is accommodated by the top lipped opening 24 of the enclosure 12. A handled tray 30 aligns in and is accommodated by the opening 28 of the fry tank 26. Donut flippers 32 and 34 align across the handled tray 30 and are actuated by a variable speed servo motor assembly 36 as also illustrated in FIG. 2. Donut flipper 32 serves to overturn donuts in the handled tray 30, and donut flipper 34 ejects the donuts from the handled tray 30. A paddle wheel 38 aligns in the handled tray 30 to draw hot cooking liquid from the fry tank 26 and propel it along the handled tray 30 when the donuts are systematically cooked. A paddle wheel drive assembly 39 mounts on the handled tray 30 and drives the paddle wheel 38. A variable output hopper 40 dispenses donut batter into the hot cooking liquid in the handled tray 30. The variable output hopper 40 is suspended from a bracket 42 which rotatingly engages about a support post 44. A hopper drive motor assembly 46 also mounts on the bracket 42 to assist in dispensation of donut batter from the variable output hopper 40. The bracket 42 with the attached variable output hopper 40 and hopper drive motor 46 pivot about the support post 44 so that the variable output hopper 40 can be positioned over the handled tray 30 for dispensation of donut batter therein. In the alternative, the variable output hopper 40 may be positioned in some position other than over the variable output hopper 40.

A gas fired tube 50 aligns in the fry tank 26 for heating of the cooking liquid. A firing module 52 rotatingly aligns and secures to the left end 18 of the enclosure 12 as later described in detail. The firing module 52 includes a combustion head 53 and an ignition unit 54 as described later in detail. A gas coupling 56 is located at the end of the firing module 52. A louvered casing 57 surrounds the components of the firing module 52. A temperature controller housing 58 secures and mates to the enclosure 26. The temperature controller housing 58 includes a rotary temperature control 59, as well as a high temperature shut down thermostat 67 and connector blocks 60, 62, 141 and 64 for connection of the connector block 62 to the servo motor assembly 36, the connector block 60 to the variable output hopper 46, the connector block 62 to the paddle wheel drive assembly 39, and the connector block 64 to the firing module 52, respectively. An electrical cable 65 connects between the connector block 64 on the temperature controller housing 58 to the firing module 52. Also included is a hopper control switch 66 and paddle wheel drive assembly and servo motor control switch 68. A normally open safety microswitch 73 is closed to allow power flow when the temperature controller housing 58 is secured and mated to the enclosure 26. Removal of the temperature controller housing 58 allows the microswitch contacts 73 to open and disrupt electrical power flow to the various components so that they will cease to function, as well as disrupting electrical power to the firing module 52. A power inverter 70 is provided so that a battery 72 can provide electrical power for operation in the field where no 110 volt nor 220 volt alternating current is available. A plurality of feet 74a–74n secure to the enclosure 12.

FIG. 2 illustrates a top view of the gas fired donut cooking system 10 where all numerals correspond to those elements previously described. Illustrated in particular is the handled tray 30 with the donut flippers 32 and 34 and the paddle wheel 38.

FIG. 3 illustrates a top view of the gas fired donut cooking system 10 with the variable output hopper 40, paddle wheel 38, paddle wheel drive assembly 39, hopper drive motor 46, the handled tray 30 and other components removed. All other numerals correspond to those elements previously described. The gas fired tube 50 is essentially U-shaped and aligns in the fry tank 26. The lipped fry tank 26 includes a left end 76, a right end 78, a front 80, a back 82 and a bottom 83. The inlet end 50a of the gas fired tube 50 secures to the left end 76 of the fry tank 26, and the exhaust end 50b secures to the back 82 of the fry tank 26. The combustion head 53 aligns with a circular hole 86 in the left end 18 of the enclosure 12, and with the inlet end 50a of the gas fired tube 50 to heat the gas fired tube 50 and the cooking oil in the fry tank 26. Exhaust gas exits the gas fired tube exhaust end 50b into the enclosure 12 and out through a plurality of louvers 88a–88n as illustrated in FIG. 4. The firing module 52 is illustrated with its louvered cover removed and includes a transformer 90, a low voltage ignition control module 92, a solenoid control valve 94 and flame tube mixer 84 secured to a bracket 96. A gas coupling 56 provides gas to the flame tube mixer 84.

An interlock system is included to prevent flame propagation when the firing module 52 is disconnected from the enclosure 12. A push rod 95 aligns with a normally open microswitch 97 in the firing module 52. When the firing module 52 is aligned against the end 18 of the enclosure 12, the push rod 95 is activated by the left end 18 against the normally open microswitch 97 to allow electrical flow to the ignition control module 92, the solenoid control valve 94, and other associated components. Removal of the firing module 52 opens the microswitch to deactivate the gas firing module 52.

FIG. 4 illustrates a cross-sectional view along line 4—4 of FIG. 3 where all numerals correspond to those elements previously described. The exhaust gas routing is illustrated by arrowed lines leading from the exhaust end 50b of the gas fired tube into the enclosure 12 and out of the louvers 88a–88n.

FIG. 5 illustrates a perspective view of the rear side of the enclosure 12, the fry tank 26 and firing module 52 where all numerals correspond to those elements previously described. Illustrated in particular are the exhaust louvers 88a–88n on the back panel 16 of the enclosure 12. A bracket 98 secures to one corner of the enclosure 12. The bracket 98 swingingly supports and accommodates the support post 44 for the hopper drive motor 46 and variable output hopper 40 illustrated in FIG. 1.

FIG. 6 illustrates the mating of the firing module 52 to the enclosure 12, thereby causing alignment of the combustion head 53 of the firing module 52 with the inlet end 50a of the gas fired tube 50 of the enclosure 12. All other numerals correspond to those elements previously described. The left end 18 of the enclosure 12 includes bullet-shaped connectors 100 and 102 for extending outwardly from the left end 18. The bullet-shaped connectors 100 and 102 have a T-shaped profile for engagement with slotted holes 106 and 104 located on the end 108 of the louvered casing 57 of the firing module 52. Engagement of the firing module 52 to the enclosure 12 is accomplished by alignment of the larger diameter portion of the slotted holes 104 and 106 of the firing module 52 with each of the corresponding bullet-shaped connectors 102 and 100, and then rotating the firing unit 52 so that the narrow regions 104a and 106a of slotted holes 104 and 106 are engaged by the bullet-shaped connectors 102 and 100, respectively. During this engagement procedure, the combustion head 53, which is also aligned with a hole 110 in end 108, is aligned with the inlet end 50a of the gas fired tube 50 in the enclosure 12. Arrows 112 and 114 indicate the mating of the firing module 52 and the enclosure 12.

Figure 7:
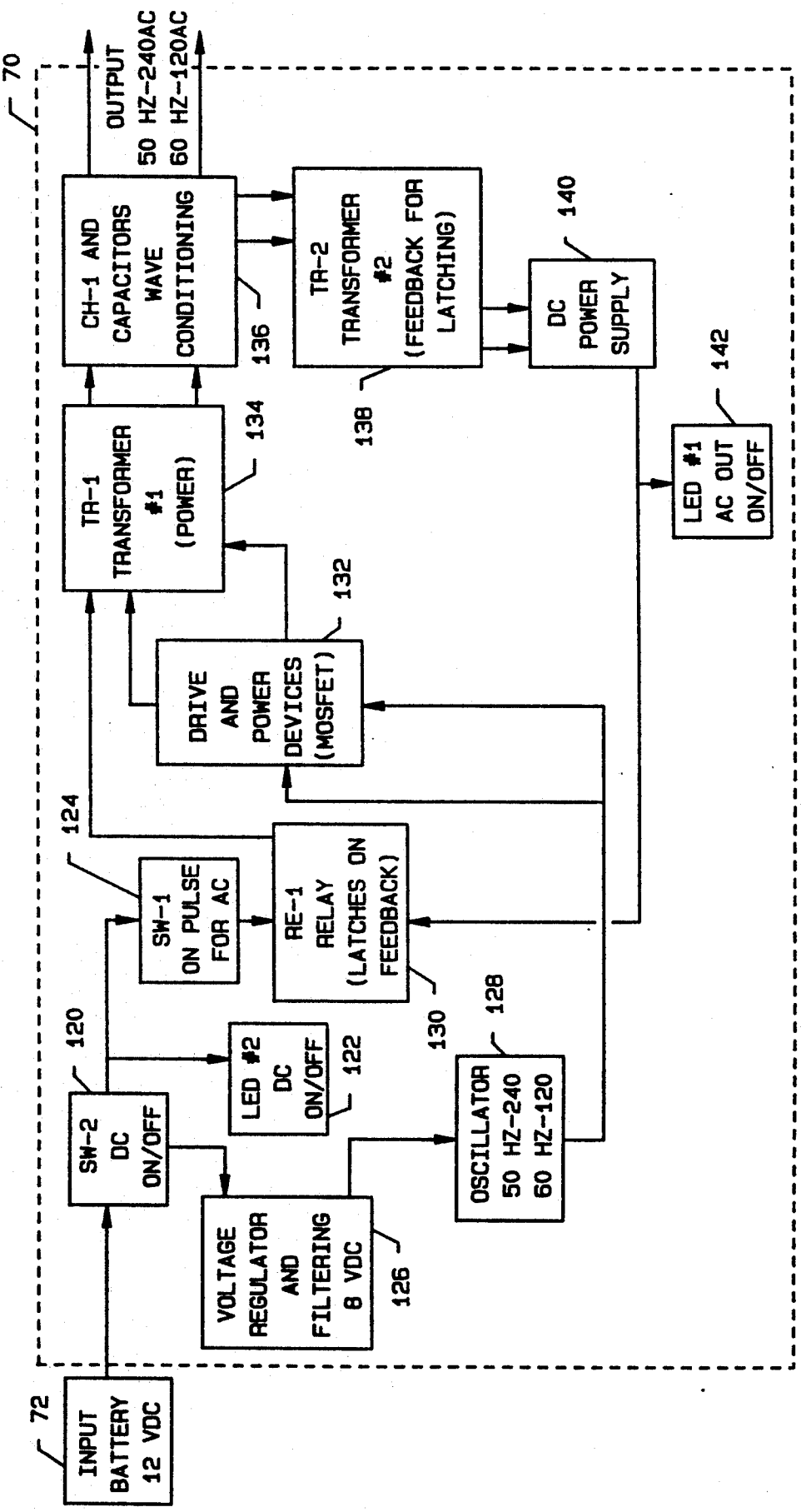
FIG. 7 illustrates a block diagram of the inverter.
Figure 8:
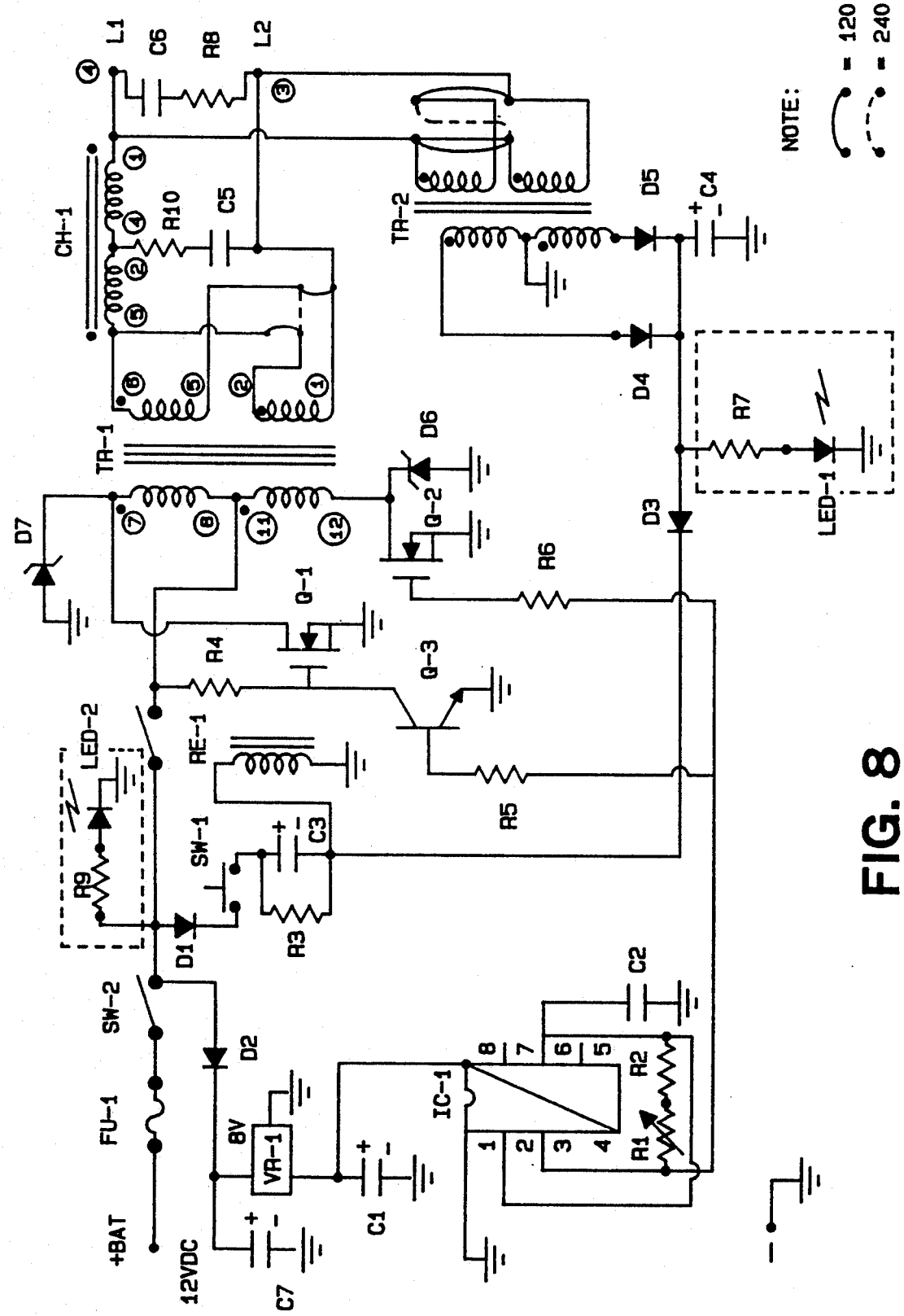
FIG. 8 illustrates a schematic diagram of the inverter.

FIG. 7 illustrates a block diagram of the power inverter 70 where all numerals correspond to those elements previously described. The power inverter 70 is used in conjunction with an external storage battery 72 such as illustrated in FIG. 1. The gas fired donut cooking system 10 is configured to operate from 110 volt AC or 240 volt AC. The power inverter 70 changes 12 volts direct current from the battery 72 to either 120 volt AC or 240 volt AC depending upon which is used in the particular country or location of usage. Jumper wires are positioned internally to supply the correct output voltage as illustrated in FIG. 8. Included is a DC switch 120, an LED 122, an AC switch 124, a voltage regulator 126 with filter, an oscillator 128, a relay 130, a driver 132, a power transformer 136, a wave conditioner 136 including a choke, a feedback transformer 138, a DC power supply 140 and another LED 142.

FIG. 8 illustrates a schematic diagram of the power inverter 70 where all numerals correspond to those elements previously described.

A very accurate type of frequency is in order for the gear motors to turn at a given rate. A timing IC is used to create the pulse rate which has a fifty-fifty balance. One reason is that the transformers tend to saturate if the timing is too long on one side over the other side. The IC is a CMOS based 7555 and has a higher impedance, which operates at a faster switching speed, and feeds back on itself to get the timing. Pin 3 feeds back through the resistor to the capacitor combination that goes into the timing pin, which is pin 6. Pin 1 is to ground, pin 2 is a triggering the initiating signal, pin 3 is the output, pin 4 is reset which normally in this case connects to the plus line to insure no reset takes place, pin 5 is open. Pin 6 is the timing pin, pin 7 is the discharge for the capacitor, but is not used in this configuration, pin 8 is your plus power coming in. This provides balanced timing, which means that at 60 cycles you've got 50% of the time on the plus side and 50% of the time on the ground plane.

With this combination, there is the drive for the transformer. $Q_1$ and $Q_2$ are FET type power transistors and are on each side of the primary transformer. Essentially, $Q_1$ and $Q_2$ take the battery signal that comes into the center tab and pull it to ground. There is one of the two that are on at a time. The output of the $Q_3$, provides means to invert input to $Q_1$ ensuring only $Q_1$ or $Q_2$ is on at a given time.

Because the FET's have a very high impedance front end, the FET's can be fed directly with a relatively low level signal and carry quite a bit of power. This particular type literally has built in it a zener type of diode that doesn't show on the print, and has been supplemented with D6 and D7, transient zener.

If there is an imbalance due to any condition at all, one side tends to go into saturation carrying a relatively heavy current and when it does it develops a fairly high transient voltage upon turn-off. That is what both the transistors and transient zeners absorb.

There is a "T" filter arrangement with the inductor. The two windings are separate in an inductor that becomes then like a self-exciter transformer. Notice by the dots on the inductor that one is feeding into the dot side on one end and one is feeding out to the dot side on the other end.

The inductor bends the wave on the front end so that it becomes something like a sine wave. The inductor retards the current flow when TR-1 is switching causing C5 to suddenly flow through the TR-1 secondary winding. It also acts as a transformer to supply a voltage to L1 to offset the sudden voltage drop of C5 and it causes an overshoot voltage that gives the characteristics of a sine wave.

One feature of the circuit is the filtering with the CH1 and the C5. A resistor in series with C5 reduces its discharge rate.

On the outside of L1 to L2, L1 being the hot side and L2 being essentially common is the C6-R8 snubber. What this does is to add to the slow down of both the drop and the rise of the signal. The signal overshoots much like one would get in a sine wave if you're comparing it to average level and then it breaks back and is somewhat squarish at the end but it is drooping off, so it's a skewed sine wave. The reason is two-fold for this application. One, if there is too high of a rise rate, which one would have with a square wave output, one might overdrive the electronics. This would cause the electronic controls to become almost transparent because the changed rate of voltage would be so fast that one would internally force trigger of the controls. The second is that with the gear motors, the hysteresis of the motor gives torque action and if one has a square wave, the applied signal has a large amount of harmonics in it which tends to overheat the laminations of the gear motors. This filter arrangement reduces the harmonics.

The TR2 down below feed back to the RE1 relay. The purpose of that is that at the end of the cycle during discharge of the battery if it gets just too low, one wants the current to drop out. The feedback holds the relay in until the voltage is down below a predetermined level, probably in about the 10 to 11 volt level. Also, the unit will not turn on if the AC circuit is short circuited.

VR1 is a voltage regulator to insure that the oscillation rate is constant over variable heat conditions, voltage conditions, etc.

The transformer T1 is made with two separate coils or bobbins that can be driven either way. It is a conventional dropping transformer, but because its field coupling is the same being driven up or down, it can be used as an inverter transformer.

MODE OF OPERATION

FIG. 1 best illustrates the mode of operation of the gas fired donut cooking system 10. Cooking liquid contained in the fry tank 26 is heated by the gas fired tube 50. The firing module 52 aligns with and introduces a flame into the inlet end 50a of the gas fired tube 50 to heat the cooking liquid. The flame in the firing module 52 is controlled by the temperature control 59 and associated components, which can be powered either by 110 or 240 volt AC directly from a wall socket or may be powered by the battery 72 and power inverter 70 when operated in a remote location where normal alternating current is not available. The variable output hopper 40 dispenses donut dough into the hot cooking liquid which flows through the handled tray 30. The paddle wheel drive assembly 39 drives the paddle wheel 38 to cause the hot cooking oil to flow from the lower regions of the fry tank 26 and across the handled tray 30. Donut flippers 32 and 34 provide for overturning donuts and ejecting them from the gas fired donut cooking system 10.

An "In Shot" type heating method, that is, the gas jet is injected into a U-shaped stainless steel tube which is immersed in the oil and hermetically welded within the fry tank. A cooking temperature (375° F. or 190° C.) is reached in less than 30 minutes. The "in shot" system is more safe and efficient than open flame burners, which radiate heat rather than "injecting" heat. The heating module attaches to the end of the "in shot" tube and has a net output of 8,500 BTU. This module includes an automatic igniter which shuts the system down if ignition does not occur within 6 seconds. Should oil temperature exceed 425° F. (268° C.) or should the temperature controller head be removed, the unit automatically shuts down. One 20 lb. (9 Kg) tank of propane will power the machine for 40 hours. The machine includes a regulator and a quick-disconnect hose (tank not included). The power inverter module is powered by a 12 volt battery and has an output of either 110 V, 60 Hz or 220 V, 50 Hz, which powers the control motors. A 100 ampere/hour battery will last about 8-9 hours before recharging.

Various modifications can be made to the present invention without departing from the apparent scope hereof.

I claim:

1. A gas fired donut production apparatus, comprising:
   (a) housing means;
   (b) dispensing means coupled to said housing means for dispensing donut batter into said housing means;
   (c) means for advancing said dispensed donut batter in said housing to facilitate systematically cooking said donut batter;
   (d) gas fired tube means disposed in said housing means;
   (e) firing module means coupled to said gas fired tube means for generating and injecting heat into said gas fired tube means, wherein said firing module means is selectively detachable from said gas fired tube means, said apparatus further comprising safety interlock means for sensing if said firing module means is properly coupled to said gas fired tube means and for disabling said firing module means when sensing that said firing module means is improperly coupled to said gas fired tube means;
   (f) temperature controller means coupled to said firing module means for controlling the temperature of said generated heat; and
   (g) power means including a battery and a power inventor, said power means connected to said firing module means for powering said firing module means.

2. The apparatus as specified in claim 1 wherein said advancing means comprises a paddle wheel assembly.

3. A gas fired donut production apparatus, comprising:
   (a) housing means;
   (b) dispensing means coupled to said housing means for dispensing donut batter into said housing means;
   (c) means for advancing said dispensed donut batter in said housing to facilitate systematically cooking said donut batter;
   (d) gas fired tube means disposed in said housing means;
   (e) firing module means coupled to said gas fired tube means for generating and injecting heat into said gas fired tube means;
   (f) temperature controller means coupled to said firing module means for controlling the temperature of said generated heat, wherein said temperature controller means is selectively detachable from said firing module means, said temperature controller means further including power disconnecting means for interrupting power between said power means and said firing module means when said temperature controller means is detached from said firing module means; and
   (g) power means including a battery and a power inventor, said power means connected to said firing module means for powering said firing module means.

4. The apparatus as specified in claim 3 wherein said advancing means comprises a paddle wheel assembly.

* * * * *